United States Patent
Yamano et al.

[19]

[11] Patent Number: 5,839,656
[45] Date of Patent: Nov. 24, 1998

[54] DEVICE FOR HEATING AND CIRCULATING FLUID FOR VEHICLES

[75] Inventors: Susumu Yamano, Kusatsu; Norio Yoshida, Moriyama; Naomi Goto, Otsu; Minoru Fukumoto, Nara, all of Japan

[73] Assignee: Matsushita Electric Industrial Co.,Ltd., Japan

[21] Appl. No.: 866,222

[22] Filed: May 30, 1997

[30] Foreign Application Priority Data

Jun. 21, 1996 [JP] Japan ................................. 8-161326

[51] Int. Cl.$^6$ ........................................................ B60H 1/02
[52] U.S. Cl. ........................................ 237/12.3 B; 180/65.1
[58] Field of Search ........................ 237/12.3 R, 12.3 B; 180/65.1

[56] References Cited

U.S. PATENT DOCUMENTS

| | | | |
|---|---|---|---|
| 4,616,697 | 10/1986 | Kotaka | 165/104.14 |
| 5,325,912 | 7/1994 | Hotta et al. | 237/2 B |
| 5,624,003 | 4/1997 | Matsuki et al. | 180/68.5 |
| 5,647,534 | 7/1997 | Kelz et al. | 237/12.3 B |
| 5,678,760 | 10/1997 | Muso et al. | 237/12.3 B |

*Primary Examiner*—Henry A. Bennett
*Assistant Examiner*—Derek S. Boles
*Attorney, Agent, or Firm*—Parkhurst & Wendel, L.L.P

[57] ABSTRACT

In a device for heating and circulating a fluid for vehicles wherein a fluid heating and delivering unit for heating and delivering a fluid, and a car room heat exchanger are annularly connected together to circulate the fluid in order to heat a car room, a bypass passage is installed in a fluid passage between the fluid heating and delivering unit and the car room heat exchanger, such that the bypass passage extends in a close vicinity to batteries to heat said batteries. The heated fluid for heating the car room is utilized to heat the batteries for driving the vehicle, so that the decrease of the battery temperature can be suppressed and the battery performance improved.

3 Claims, 2 Drawing Sheets

DEVICE FOR HEATING AND CIRCULATING FLUID FOR VEHICLES

FIELD OF THE INVENTION

This invention relates to a device for heating and circulating a fluid for electric vehicles wherein room heating is effected by circulation of the heated fluid.

BACKGROUND OF THE INVENTION

A conventional room heater for electric vehicles, as shown in FIG. 2, comprises a hot water unit 103 which consists of a heater 101 for producing hot water and a pump 102 for delivering hot water produced by the heater 101, a car room heat exchanger 104, and pipes 105 and 106 for connecting them together, wherein room heating is effected by circulation of hot water between the hot water unit 103 and the car room heat exchanger 104.

However, since the hot water produced in the hot water unit 103 of the conventional heating system is only circulated through the car room heat exchanger 104 by the pipes 105 and 106, the hot water unit 104 is used only for the heating of the car room.

Therefore, there is a problem that even if the batteries for driving the electric vehicle decrease in temperature to the extent that the chemical change in the batteries is suppressed to generate a decreased voltage, it is impossible to warm the batteries by the hot water. Thus, it has been necessary to provide separate means for protecting the driving batteries from decreasing in temperature.

DISCLOSURE OF THE INVENTION

The present invention, which solves the above problem, is intended to utilize the heated fluid, which is used to heat the air in the car room, to keep the batteries warm, thereby suppressing the lowering of the battery temperature, improving the battery performance.

To solve the above problem, the arrangement according to the invention comprises a fluid heating and delivering unit for heating a fluid by a heater and delivering it by a pump, a car room heat exchanger, said unit and said heat exchanger being annularly connected together by a fluid passage, said fluid passage having a bypass passage, said bypass passage extending in close vicinity to the car driving batteries. With this arrangement, it becomes possible to accelerate the chemical change occurring in the batteries and prevent the lowering of the generated voltage due to a temperature decrease, and to maintain the improved battery performance.

Further, control valves may be used to switch the flow of the heated fluid to either the car room heat exchanger side or the bypass passage side or both sides so as to provide a desired heating which answers the intended purpose.

Further, since there is no need to provide a heating arrangement exclusive to the batteries, the keeping of the batteries warm can be effected at low cost.

DESCRIPTION OF THE PREFERRED EMBODIMENTS

Figure 1:
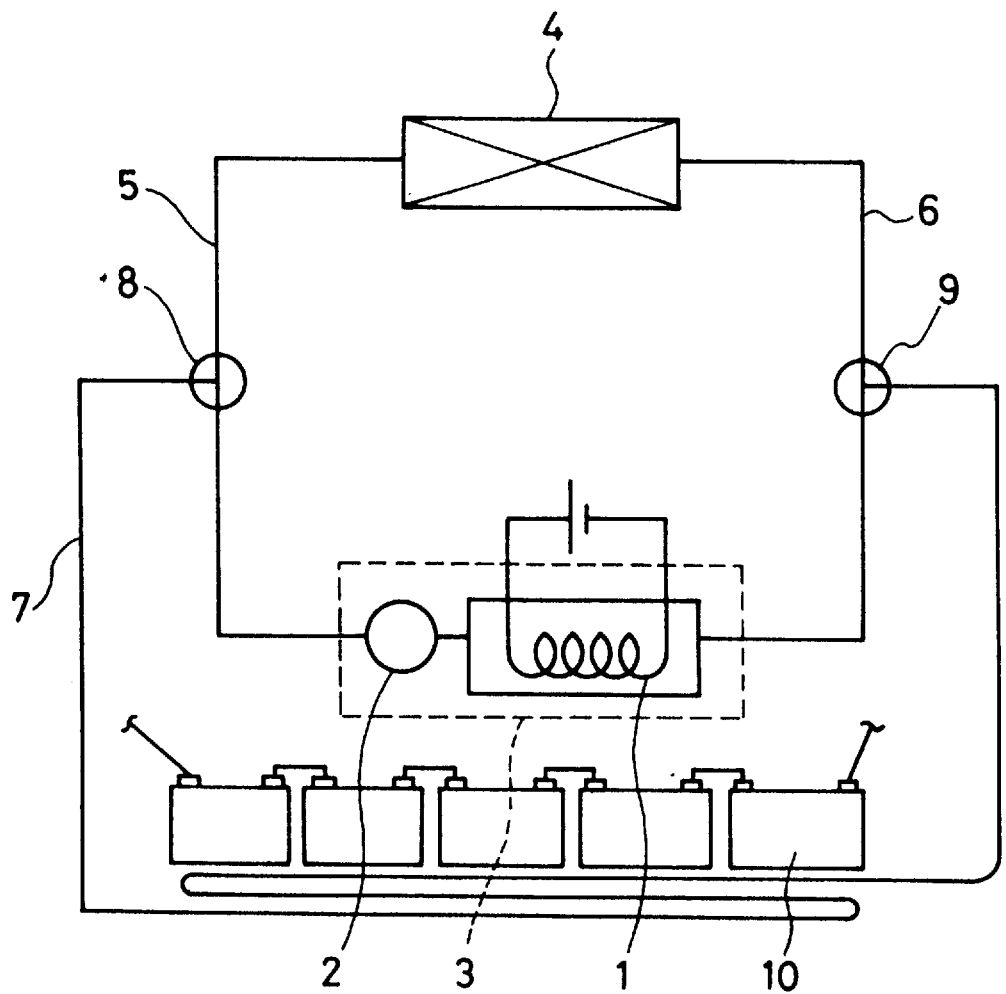
FIG. 1 is a cycle diagram of a device for heating and circulating a fluid for electric vehicles according to the present invention.
Figure 2:
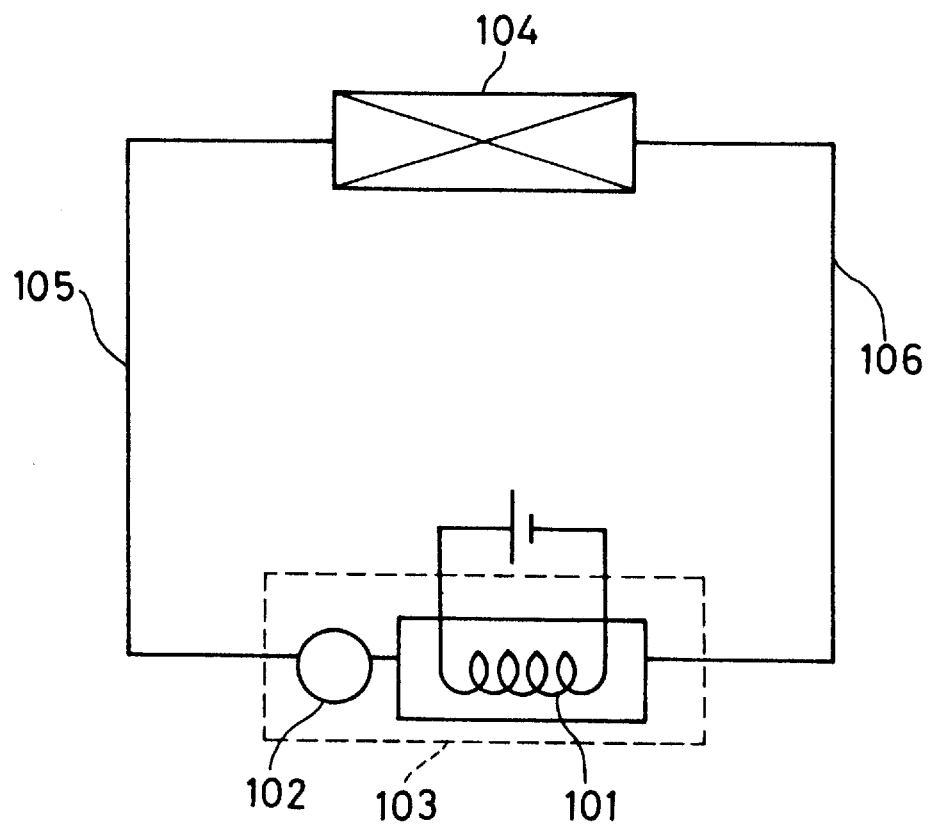
FIG. 2 is a cycle diagram of a conventional room heater for electric vehicles.

The invention will now be described with reference to FIG. 1 showing a device for heating and circulating a fluid for electric vehicles (hereinafter referred to as the EV fluid heating and circulating device).

The EV fluid heating and circulating device, as shown in FIG. 1, includes a hot water unit (fluid heating and delivering unit) 3 which consists of a heater 1, such as a sheath heater and a pump unit 2 for delivering hot water (or antifreeze solution) heated by said heater 1, and fluid passage means, i.e., a delivery pipe 5 and a return pipe 6 which are used to annularly connect the hot water unit 3 and the car room heat exchanger 4.

This device is characterized in that the delivery pipe 5 and return pipe 6 have a bypass pipe (bypass channel) 7 connected thereto through control valves 8 and 9 which are operatively associated with each other, said bypass pipe 7 extending in close vicinity to car driving batteries 10.

The control valves 8 and 9 operable in association with each other are three-way valves whose ports can be switched by electromagnetic coils (not shown), the arrangement being such that signals fed to hand switches (not shown) or temperature sensors disposed adjacent the batteries cause voltage to be imposed on or removed from the control valves, so that the respective switching operations for the ports of the two control valves are associated with each other.

With the above arrangement, the hot water heated by the heater 1 is delivered by the pump 2 to flow through the delivery pipe 5, with the control valve 8 controlling the direction of flow of the hot water by switching the latter to flow through either the car room heat exchanger 4 or the bypass pipe 7 or through both the car room heat exchanger 4 and the bypass pipe 7.

It is arranged that at this time the control valve 9 operates in association with the control valve 8.

Therefore, in the case where the hot water is fed to the bypass pipe 7 by the control valves 8 and 9, it flows in close vicinity of the batteries 10 which are used to drive the electric vehicle, so that the driving batteries 10 can be heated.

Further, the switching control using the control valves 8 and 9 makes possible switching to the heating of the car room, the heating of the batteries or the heating of both the car room and the batteries.

In addition, the above embodiment has been described with reference to an electric vehicle but the same merits can also be obtained by applying the invention to a hybrid-electric vehicle (HEV) using a combination of engine drive and battery drive.

As is clear from the above description, according to the present invention, a bypass passage is connected between a fluid heating and delivering unit and a car room heat exchanger to extend in close vicinity to the batteries so as to heat the latter by the hot water; therefore, the chemical change taking place in the batteries can be prevented from being degraded due to decreased temperature, thereby preventing the generated voltage from dropping; thus, the battery performance can be improved. Further, with the control valves used, the flow of the heated fluid can be switched to the car room heat exchanger side, the bypass side or both sides, and there is no need for a separate heating arrangement exclusive to the batteries, making the arrangement inexpensive.

What is claimed is:

1. A heating device for heating and circulating a fluid to heat batteries and a passenger compartment for electric vehicles (EV) and hybrid electric vehicles (HEV), said heating device comprising:

heating means comprising an electric heater to provide a heat source being electrically generated and independent from a motor of said EV and HEV;

a car room-heating exchanger having an annular connection to said heating means by a fluid passage; and a bypass passage communicating with said fluid passage and adjacent to said batteries so that said batteries are heated by the passage of heated fluid through said bypass passage.

2. The heating device of claim 1 further comprising:

at least one control valve regulating the fluid between said bypass passage and said car room-heat exchanger, so that at least one of said passenger compartment and said batteries are capable of being heated.

3. The heating device of claim 2 further comprising:

a temperature sensor adjacent to said batteries, said temperature sensor signaling said at least one control valve to regulate the fluid to stabilize the temperature sensed adjacent to said batteries.

* * * * *